Figure 1:
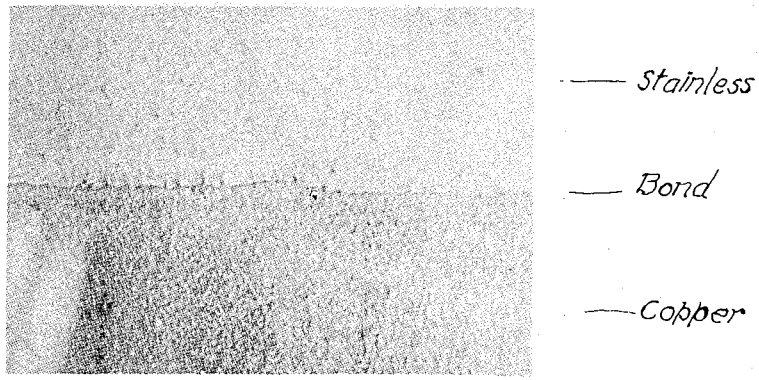

May 8, 1956     J. KINNEY, JR     2,744,314

METHOD OF MAKING MULTIPLY METAL

Filed Aug. 9, 1950

— Stainless
— Bond
— Copper

— Copper
— Bond
— Stainless

INVENTOR
Joseph Kinney Jr.
by: Green McCallister Miller
his Attorneys

United States Patent Office 2,744,314
Patented May 8, 1956

2,744,314

METHOD OF MAKING MULTIPLY METAL

Joseph Kinney, Jr., Carnegie, Pa.

Application August 9, 1950, Serial No. 178,414

3 Claims. (Cl. 29—471.5)

This invention relates to procedure for bonding stainless metal and copper under conditions such as to produce a composite metal in rolled sheet or rolled strip form. An object of this invention is to produce a simple and at the same time effective procedure for bonding copper and stainless metal of various types, so as to produce an effective composite or multiply metal in strip or sheet form, which includes one or more ply of rolled stainless metal and at least one ply of rolled copper and in which the separate ply are effectively bonded throughout the entire extent of their contacting surfaces.

A further object is to produce a multiply metal made up of stainless steel and copper wherein the two metals are effectively bonded together and in a form such that the multiply metal may be readily employed in the production of cooking and other utensils and structural parts such as pipes, conduits, troughs and liners and also seamless tubes.

These and other objects, made more apparent throughout the further description of my invention, are attained by the process herein described, some of the steps of which are indicated by certain of the views included in the drawings accompanying and forming a part hereof.

In the drawings, Figure 1 is a view of a sheet or strip of copper bonded in accordance with my invention to a strip or sheet of stainless steel and showing the microstructure at the line of bond (magnification 200 ×) the face of each metal having been polished and then etched with oxalic acid.

Figure 2:
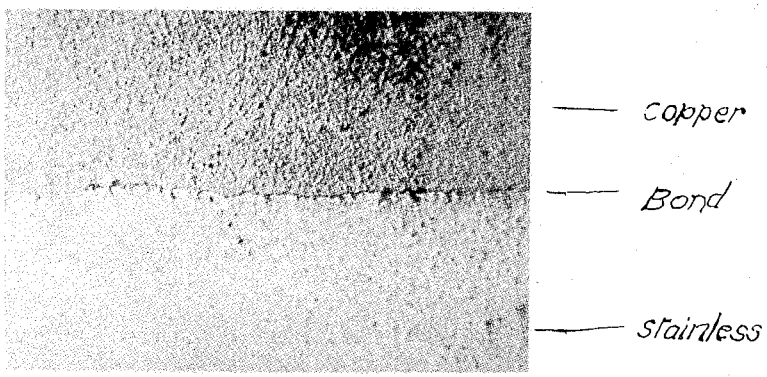

Figure 2 is a view similar to Figure 1 showing the microstructure at the bond line of copper and stainless steel where the bonding was accomplished by an old bonding procedure in which the surface to be bonded of at least one of the metals was plated prior to the bonding operation, in an attempt to facilitate bonding.

Figure 3:
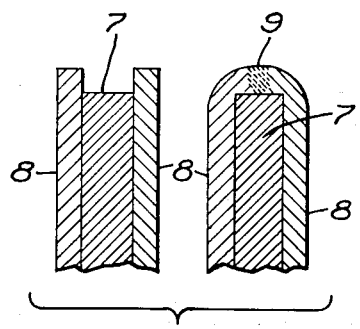

Figure 3 includes two fragmental views which from left to right illustrate the results accomplished by two successive steps employed in carrying forward the bonding operation of my invention.

Figure 4:
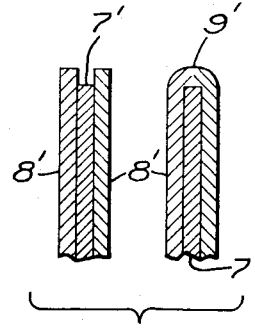

Figure 4 includes two views corresponding to the views of Figure 3 but illustrating the effect of two successive steps of my bonding procedure where the procedure is employed for the purpose of bonding thinner sections of metal than those shown in Figure 3.

Figure 5:
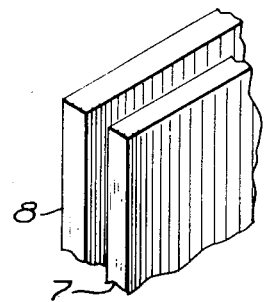

Figure 5 is an isometric view of fragmental portions of metal plates and illustrating a preliminary step employed in the operation of bonding plates of copper and stainless metal such as stainless steel.

The procedure involving my invention includes the following essential steps:

Plates of copper and stainless steel are assembled in packs or what may be termed bonding assemblies. In such an assembly one or more plates may be of such dimension as to overhang another plate of the assembly around the entire marginal edge thereof. In each case the amount of overhang will vary depending upon the thickness of the plates to be bonded and the overhung or smaller plate is located substantially centrally of the larger plate or plates so that the overhang is substantially equal along all edges of the assembly.

Generally speaking, each bonding assembly includes a copper plate sandwiched between two stainless plates. The number of plates included in an assembly will, however, vary depending upon the final product. It may, however, be stated that an assembly may include but one stainless plate and but one copper plate. While each plate included in an assembly is provided with relatively flat surfaces, the plates may be produced by a commercial rolling operation carried to the extent necessary to produce plates of the desired thickness.

Shortly before assembling the plates, they are pickled and/or otherwise treated to assure that the surfaces thereof to be bonded are clean and substantially free of oxides. The clean and oxide-free surfaces are then placed in direct contact with each other in the pack or assemblies. That is to say, the assemblies are devoid of films, fluxes or metallic plating between the copper plates and stainless plates to be bonded. As a preliminary to the bonding step of my process, each bonding assembly is subjected to pressure under conditions such as to force substantially all air or other gas from between the contacting surfaces which are to be bonded. This is accomplished by a press or so-called cladding machine.

Thus one of the functions of the cladding machine as employed in carrying forward my process, is to force the surfaces of the plates, included in an assembly, into what may be termed "gas-excluding" contact with each other. The cladding machine also holds the plates in this relationship during a welding operation in which the edges of the plates are welded together around or throughout the entire margin of the assembly. That is to say, the weld for securing plates of the assembly, together extends uninterruptedly around the entire margin of the assembly and is formed while the surfaces to be bonded are held under pressure in gas-excluding contact with each other. This relationship is maintained by the welding operation after the assembly is removed from the cladding machine. The plate-engaging surface of each platen of the cladding machine is "machined" flat and the two surfaces are located in parallel relationship. They extend vertically and at least one platen is moved toward the other in applying pressure to the assembly located between them.

The pressure employed in forcing the surfaces to be bonded into a substantially gas-excluding relationship, is such that it is capable of distorting the surface of the softer metal (copper) an amount sufficient to cause it to substantially conform to the contour of the surface of the harder metal (stainless) engaged by it. In this way, such surface differences as may exist between the contacting plates are substantially eliminated. The welding operation is carried forward under conditions to facilitate the production of a continuous weld which extends entirely around the assembly, and is effective in securing the plates of the assembly together and in hermetically sealing the plates into gas-excluding engagement with each other. For this reason the continuous weld must be devoid of air or gas bubbles, checks and cracks. In order to produce such a weld the plate-engaging platens of the press or cladding machine are so mounted that they may be turned to different positions, during the welding operation, without releasing or in any way reducing the pressure imposed on the assembly. With such an arrangement each edge of the assembly may be turned to that position which will facilitate the production of the desired type of weld along that edge.

After the assembly is edge welded, it is heated to a hot working temperature of the stainless component of the assembly and while so heated the contacting surfaces of the assembled plates are pressed into bonding relationship, for example, by a hot rolling operation. During this operation the contacting surfaces of the different plates of the assembly are bonded together under conditions such that the bond is coextensive with the area of contact between the contacting surfaces of the plates of the assembly.

After the bonding is accomplished the welded edges of the assembly are sheared off under conditions such as to true up the assembly, that is produce straight edges along the four sides of the assembly with each edge extending substantially at right angles to adjacent edges. The hot working may then be continued if additional working is necessary to bring the assembly to the desired shape or thickness. The hot working may be followed by cold working. When the assemblies are rolled the final pass, hot or cold as the case may be, is ordinarily a planishing pass, i. e., a pass just sufficient to produce satisfactory surface conditions on the strip or sheet of multiply metal thus formed. The multiply metal is then further fabricated into finished products by further working such as spinning, pressing, drawing, etc.

From this brief outline, it is apparent that my new process is an improvement on all previous bonding processes and particularly those commercially employed for the purpose of bonding copper and stainless metals. One reason for the simplicity is that commercially produced plates of both stainless and copper may be employed as the raw material going into the make-up of the final product, i. e., multiply-metal sheet or strip. The simplicity also results from the fact that the bonding operation may be carried forward in the air and further, there is no necessity for employing any intermediate substance between the surfaces to be bonded.

Heretofore it has been considered necessary, in the production of multiply strip or sheet, to plate or otherwise deposit a metal or other film onto one or both of the metallic surfaces to be bonded. This has been considered absolutely essential where copper and stainless sheets or plates were to be bonded. One reason for resorting to such plating was that it was considered necessary to provide a barrier between the metals of different characteristics in order to prevent the migration of one raw metal into the other. Another reason for providing a film on one or both metals involved by a bonding operation, was to prevent oxidation of the surface or surfaces to be bonded and also to provide for adhesion of the two surfaces. I have discovered that the use of such plating or films is not necessary either from the standpoint of the protection from oxidation, facilitating the bonding, or from the standpoint of preventing objectionable migration. As a matter of fact, tests have disclosed that, with my improved procedure, bonding without the intervention of a metallic or other film is just as effective as where the metallic film is employed and tests have also disclosed that, with the improved procedure, migration of one metal into the other is no greater where the surfaces to be bonded are in direct contact with each other than where an intervening film is plated onto one or both surfaces. It should be noted that I am aware of the fact that the attempt has been made to bond copper to iron or steel without the use of a film or plating, but all such procedures either involved casting, plating, spraying or otherwise depositing one metal, not in a rolled state, on the other or the use of specially formed bimetallic billets which are to be substantially reduced. In addition, such bonding operations as involved copper usually proceeded on the theory that it was necessary to employ oxygen-free or deoxidized copper, and this added to the complexity and cost of old procedures.

In carrying forward my procedure under commercial conditions, I employ copper plates usually within the range of from 0.050" to 0.325" thick. These plates may be commercial grades of electrolytic or fire refined copper commercially rolled to gauges substantially within such limits. The thickness as well as the other dimensions of the plates going into the make-up of the bonding assemblies may vary, depending upon the thickness of the sheet or strip to be produced. With a press or cladding machine such as has been employed by me, the plates going into the make-up of an assembly may be 37" wide and 61" long. The stainless plates may differ materially in composition, for example, they may be formed from alloys having a nickel, a cobalt, a titanium, an iron or other metallic base. They are ordinarily somewhat thicker than the copper plates of an assembly, although it may be noted that in some operations, involving my invention, I have employed stainless plates ranging as low as 10% of the thickness of the associated copper plate. The gauges of the plates employed in each assembly will, of course, vary depending upon the requirements as to ply thicknesses in the final product. The stainless plates are ordinarily commercially hot rolled, descaled flat plates.

Shortly before, and preferably almost immediately before making up a bonding assembly, the plates are processed in order to clean the surfaces to be bonded and free them from grease, oxide and other foreign material. This is accomplished, with the ordinary type of copper plate employed, by washing in a solution such, for example as a sodium cyanide solution including about 7 ounces of sodium cyanide to the gallon of water. After washing, the copper plates are rinsed in hot water and maintained in the rinse water for at least a few minutes. The copper plates are then dried either by heating or by air currents. Shortly before including each stainless plate in a bonding assembly, it is cleaned, for example, by a light pass of an abrasive substance performed under conditions such that the surface to be bonded is at least momentarily oxide-free. The copper and stainless plates so processed are then assembled as previously described, with the substantially oxide-free surfaces of adjacent plates in direct contact with each other. That is to say, each copper plate engages a stainless plate and the assemblies are devoid of any film, metal plating or other substance located between the adjacent surfaces of the plates to be bonded.

The assembly is placed between the opposed platens of the cladding machine. The plate-engaging surface of each platen is as nearly flat as it can be made by usual metal working operations, and the platens are so positioned that the engaged assembly and, consequently, the surfaces to be bonded, extend vertically as pressure is applied to them and during the subsequent welding operation. The pressure applied to the assembly is such that it is at least 40 pounds per square inch of surface to be bonded and, as previously noted, after this pressure is applied it is maintained on the plates until the welding operation is completed.

In addition, the platens are so designed and formed that the maximum pressure finally applied to an assembly is greatest in the central zone of the contacting plates and decreases progressively toward the edges of the plates. The rams forming a part of the cladding machine assembly and on which the platens are mounted, are of substantial cross sectional area and are located centrally of the platens. For this reason the maximum pressure is exerted centrally of the platens and while the platens resist appreciable distortion under the pressures employed, they yield as noted, with the result that maximum pressure is applied to the central portion of the plates of the assembly but is never applied around the marginal edges of the assemblies. This contributes to the operation of forcing the surfaces to be bonded into gas-excluding contact with each other since pressure sufficient to distort the surface of the copper plate, as previously described, is first applied to the central zone of the assembly and is finally applied throughout the entire extent of each surface to be bonded.

After the plates of the assembly are forced into gas-excluding contact they are held under the final pressure applied to the assembly throughout the welding operation. The cladding machine is so formed that the platens, while under pressure and while their opposed, pressure-imparting surfaces extend vertically, may be turned in a vertical plane through an arc of 360°, thus making it possible to move each edge of the assembly to a position which best contributes to the production of an effective weld. The welding is accomplished under an inert gas atmosphere and, for example, heliarc welding equipment may be employed.

In Figure 3 I have illustrated what may be termed a heavy assembly, i. e., one in which the assembly is at least ¾" thick from external surface to external surface. By way of contrast an assembly which is 3/16" thick may be designated as a light assembly although it is apparent that any assembly which is less than ¾" thick may be designated as a light assembly. In both of the views of Figure 3 the assembly is made up of a central or core plate 7 of copper and includes two stainless plates 8 which are located on opposite sides of the copper plate. Both the views of Figure 3 generally illustrate what I have referred to as a heavy assembly.

The two views of Figure 4 illustrate a light assembly and, like the views of Figure 3, disclose an assembly made up of a copper plate 7' sandwiched between two stainless plates 8'. One difference between the views is the dimensions of the plates going into the make-up of the assembly. In welding an assembly such as is shown in Figure 4, the overhang of the stainless plates may be and preferably are employed as the weld material. For example, the arc of a heliarc welding apparatus is so applied to each edge of the assembly that the overhanging portion of each plate 8' is raised to a welding temperature while maintained in a neutral atmosphere, such as an atmosphere of argon gas. During the welding operation the edges of the stainless plates are caused to merge and to form a weld somewhat as illustrated at 9 in the right hand view of Figure 4. That is to say, the molten stainless metal resulting from the heating of the edge of one plate 8', merges with the molten metal flowing from the edge of the opposed stainless plate and, therefore, autogenously welds the two stainless plates together while forming a gas-excluding continuous weld along the edges of the copper plate 7'.

A thicker assembly, such for example as the assembly illustrated in the two views of Figure 3, may necessitate the use of a filler or weld rod in accomplishing the continuous edge welding operation. Under such conditions it may be convenient to employ an aircomatic welding apparatus which is capable of automatically feeding a filler or weld rod as the welding operation proceeds. In each case, however, the overhanging edges of the stainless plate provides at least a portion of the metal going into the make-up of the weld. That is to say, whether a heavy or a light assembly is welded, metal which is melting down from the edge of an overhanging plate constitutes, at least, a part of the weld metal.

Under all conditions the weld when completed must be such that it will readily respond to the subsequent rolling operation. For this reason if a weld rod is employed it must be carefully selected and I have found that a weld rod including a high percentage of nickel (about 60% nickel) will ordinarily produce a satisfactory weld. It, however, might be noted that the percentage of nickel in the weld rod should be at least as great as the nickel content of the stainless plate or plates involved.

In Figure 5 I have shown by a fragmental isometric view the relative positions of a copper plate 7 and a stainless plate 8 such as are included in the make-up of the assemblies shown in Figure 3. It, however, will be apparent that Figure 5 also illustrates a two-ply assembly, i. e., one in which the assembly includes but one stainless plate in contact with a single copper plate. Where two-ply composite metal is to be produced each assembly will, of course, include a make-up such as just described.

Under such conditions the copper and stainless plates are similar, from the standpoint of origin and type of plates, to the plates previously described as going into the make-up of three-ply composite metal. That is to say, each copper plate may range in thickness from 0.050" to 0.325", is commercially flat and clean and is cut to convenient size from the standpoint of surface area. Likewise the stainless plates may be formed as previously described and may be of various compositions.

The two-ply assembly is placed between the vertically disposed, opposed surfaces of the pressure-applying platens forming part of a press or cladding machine and one of the plates may be of such dimensions, that it extends beyond or overhangs each edge of the other plate. Pressure is applied under conditions previously described, i. e., sufficient pressure is exerted on the assembly to cause the contacting surface of the copper plate to distort and thus intimately engage the surface of the stainless plate so that it is in gas-excluding contact with that surface throughout the entire extent of the contacting surfaces to be bonded. This pressure is maintained throughout the welding operation, and again, the welding operation may be accomplished with or without the use of a weld or filler rod, but must be accomplished under conditions such as to avoid oxidation or the production of a weld which includes air or other gas bubbles, checks or incipient cracks. It must also be continuous throughout the entire marginal edge of the assembly.

Where two-ply composite metal is being produced two assemblies are located in contact with each other and, consequently, the copper plates are engaged by the opposed platens. Before the two assemblies are located in the press the external surfaces of the stainless plates may be coated with a nonvolatile, separating compound which will prevent the stainless plates from being stuck together at the end of the bonding operation.

It will be apparent that the only limitation placed on the number of ply included in the completed multiply sheet or strip and the width and length of the same is that imposed by the cladding machine and the pressure-applying equipment employed after the edge welding of the assembly. For example, each assembly may include two or more copper plates with the requisite number of stainless plates to produce strip or sheet in which each copper plate is located between two stainless plates, or strip or sheet in which each stainless plate is located between two copper plates.

After the continuous edge welding operation has been completed the assemblies may be stored for subsequent bonding. As a preliminary to bonding, each assembly may be retained in a furnace existing at a temperature between 1650° F. and 1950° F. for a sufficient time to heat the stainless plate or plates, of the assembly, to at least a low forging temperature. The assembly is then subjected to sufficient pressure to accomplish the bonding of the contacting surfaces of the different plates included in its make-up independently of whether copper plates are sandwiched between stainless plates or a copper plate constitutes a face of the assembly. After the bonding is accomplished the assembly may be reheated and reduced to the desired gauge. Cold rolling may constitute the final strip or sheet-forming operation. The sheet or strip thus produced is then processed so as to anneal its stainless components and it is then fabricated into different commercial articles.

It should be noted that there is a relationship between the time, temperature and pressure employed in the operation of accomplishing a bond. With the higher temperatures—within the range above noted—shorter times and lower pressures are required. I, however, prefer to employ a temperature-time relationship in which the assembly is heated—within the range above specified—to a low forging temperature of the stainless metal. From the standpoint of time and pressure I prefer to subject the bonding assembly to a rolling operation in which the pressure employed is sufficient to reduce the thickness of the assembly by, for example about 3% in one or more passes, in which the rate of rolling is about 175 feet per minute.

In Figures 1 and 2 I have shown photomicrographs of results obtained in bonding copper to stainless steel under conditions such as are obtained by following the procedure of my invention and also under conditions where a plated film of nickel is employed between the copper and the stainless steel. Figure 1 discloses the copper and stainless steel bonded in accordance with my invention wherein the plating operation is omitted. Figure 2 is a view corresponding to Figure 1 in which the bonding is also accomplished in accordance with my invention but only after the stainless steel is electroplated with a thin coating of nickel. From these views it will be apparent that the bond obtained is about the same in both views. It is, however, noted that by omitting the plating operation I materially simplify the bonding procedure and the apparatus employed in carrying out the procedure. The omission of the plating also minimizes the chance of occasioning embrittlement of either the hard or the soft metal going into the make-up of the multiply stock.

In addition, I have discovered that I consistently obtain effective bonding throughout the entire extent of the contacting surfaces of the plates by the procedure of my invention, whereas bonding in accordance with old procedures—whether or not a plated film intervenes between the plates—is ordinarily not as uniform or as consistently obtained as with my new procedure. It is, therefore, apparent that my invention not only provides a simplified procedure but also a procedure which is more effective in consistently producing an effective bond, uniform throughout the entire extent of the surfaces to be bonded, than previously known procedures.

While I have defined and described the now preferred procedure which constitutes my invention, it will be apparent that various changes, additions, modifications and substitutions may be made in the procedural steps disclosed without departing from the spirit and scope of my invention as defined by the appended claims.

What I claim is:

1. A method of producing multiply metal in strip or sheet form and including at least one ply of soft metal sandwiched between two plies of hard metal bonded throughout the contacting surfaces thereof, which consists in rolling plates of each such metal; processing such plates to remove oxide and other foreign material from the rolled surfaces thereof to be bonded; assembling the plates so processed into a bonding assembly with a rolled and processed surface of each soft metal plate engaging a rolled and processed surface of a hard metal plate; forcing the contacting surfaces of the plates of such assembly into gas-excluding engagement with each other by applying pressure to such assembly of such p. s. i. of plate surface to cause the surface of each soft metal plate to distort and substantially conform to the contour of the surface of the hard metal plate engaged thereby, such force progressively decreasing from the central portion to the edges of the plates included in the assembly; sealing the entire marginal edge of the plates of the assembly while maintaining the assembly under such pressure by edge welding the assembly around the entire marginal edge thereof; heating the assembly to a hot working temperature of the hard metal included therein; and subjecting the assembly to a rolling reduction of at least 3% while so heated and while the assembly is so sealed; and then severing the sealed edges of the assembly.

2. A method of producing multiply metal in sheet or strip form and including at least one ply of copper sandwiched between plies of stainless steel bonded thereto throughout the entire extent of the contacting surfaces thereof, which consists in rolling substantially flat plates of such metals to a gauge greater than but approximating that of such plates in the finished multiply product; processing each of such plates to remove oxide and other foreign material from the surfaces thereof to be bonded; assembling the plates so processed into a bonding assembly with a copper plate located between stainless steel plates and with each rolled and processed surface of such copper plate in direct contact with a rolled and processed surface of a stainless steel plate; forcing the contacting surfaces of the plates into gas-excluding contact with each other by subjecting the assembly to a flattening force of such pressure as to cause each surface of the copper plate to distort and substantially conform to the contour of the surface of the steel plate engaged thereby, such force progressively decreasing from the central zone of the plates of the assembly toward the edges of such plates; hermetically sealing the edges of the plates of the assembly against the admission of gas between the contacting surfaces thereof by edge welding the entire marginal edge of the assembly while the assembly is subjected to such flattening force; heating the assembly to a temperature within the range of about 1650° F. to about 1950° F.; then roller reducing the assembly by at least 3% while so heated and while the entire marginal edge thereof is so sealed; and then severing the welded edges of the assembly.

3. A method of producing multiply metal in strip or sheet form and including at least one ply each of copper and stainless steel bonded throughout their adjacent surfaces, which consists in rolling flat plates of each such metal; processing such plates to remove oxides and other foreign material from rolled surfaces thereof to be bonded; assembling the plates so processed into a bonding assembly with at least one processed surface of a copper plate engaging a processed surface of a stainless steel plate; forcing the engaging surfaces of such plates into gas-excluding contact with each other by applying pressure to the assembly of such force as to cause the engaged surface of the copper plate to distort and substantially conform to the contour of the surface of the stainless steel plate engaged thereby throughout the extent of such engagement, such force progressively decreasing from the central portion to the edges of the plates included in such assembly; maintaining the assembly under such pressure so applied while the entire marginal edge thereof is sealed by an edge welding operation extending around the entire edge thereof; heating the assembly to a forging temperature of the stainless steel included therein; hot rolling the assembly while so heated to reduce the thickness thereof by at least 3% while the plates are so sealed; and then severing the sealed edges of the assembly from the plates included in the assembly.

References Cited in the file of this patent

UNITED STATES PATENTS

| Number | Name | Date |
|---|---|---|
| 530,719 | Rodig | Dec. 11, 1894 |
| 1,040,606 | Auth | Oct. 8, 1912 |
| 1,193,667 | Corey | Aug. 8, 1916 |
| 1,392,416 | Henderson | Oct. 4, 1921 |
| 1,804,237 | Steenstrup | May 5, 1931 |
| 1,886,615 | Johnson | Nov. 8, 1932 |
| 1,956,818 | Acre | May 1, 1934 |
| 2,018,725 | Johnson | Oct. 29, 1935 |
| 2,053,096 | McKay | Sept. 1, 1936 |
| 2,199,321 | Ostendort | Apr. 30, 1940 |
| 2,269,523 | Deutsch | Jan. 13, 1942 |
| 2,366,178 | Chace | Jan. 2, 1945 |
| 2,395,878 | Keene | Mar. 5, 1946 |
| 2,482,897 | Chace | Sept. 27, 1949 |

FOREIGN PATENTS

| Number | Country | Date |
|---|---|---|
| 616,798 | Great Britain | Jan. 27, 1949 |